US007530279B2

(12) United States Patent
Iwamatsu et al.

(10) Patent No.: US 7,530,279 B2
(45) Date of Patent: May 12, 2009

(54) SAMPLER FOR SAMPLING CHARGED PARTICLES, AND APPARATUS FOR MEASURING CHARGE DISTRIBUTION OF THE CHARGED PARTICLES

(75) Inventors: Tadashi Iwamatsu, Nara (JP); Hiroaki Masuda, Nishinomiya (JP); Shuji Matsusaka, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 270 days.

(21) Appl. No.: 11/439,413

(22) Filed: May 22, 2006

(65) Prior Publication Data

US 2006/0283270 A1 Dec. 21, 2006

(30) Foreign Application Priority Data

May 23, 2005 (JP) ........................... P2005-149567

(51) Int. Cl.
*G01N 1/00* (2006.01)

(52) U.S. Cl. ........................................................ 73/863

(58) Field of Classification Search ........................ None
See application file for complete search history.

(56) References Cited

U.S. PATENT DOCUMENTS 4,375,673 A 3/1983 Lewis et al.
5,142,336 A * 8/1992 Hotomi et al. .............. 399/281

FOREIGN PATENT DOCUMENTS

JP 363135874 * 6/1988
JP 2001-116786 A 4/2001
JP 2002-311073 A 10/2002

OTHER PUBLICATIONS

Kimura, M.: "Toner-Charge Measuring Method (2)-charge amount-", Electrophotography, pp. 168-174, vol. 30, No. 2 (1991), the Society of Electrophotography of Japan, Tokyo, Japan.

Tsujimoto, H. and Kaya, N.: "Effect of suction air velocity and field voltage on measurement for charge amount by E-SPART analyzer", the Micromeritics (Funsai in Japanese), pp. 48-54, No. 35 (1991).

Masuda, H., Gotoh, K., and Orita, N.: "Charge Distribution Measurement of Aerosol Particles", the Journal of Aerosol Research, pp. 325-332, vol. 8, No. 4 (1993), Japanese Association of Aerosol Science and Technology, Kanazawa-shi, Japan.

* cited by examiner

*Primary Examiner*—Robert R Raevis
(74) *Attorney, Agent, or Firm*—Edwards Angell Palmer & Dodge LLP; David G. Conlin; Peter J. Mamus

(57) ABSTRACT

A sampler introduces charged particles to be measured into an measuring apparatus for measuring charge distribution of the charged particles. The measuring apparatus has a main body, a guide member, and an electric field curtain generating section. The main body has a first opening at upper side and a second opening at lower side, the first opening being adapted to receive the charged particles, the second opening being adapted to discharge the charged particles. The guide member defines a path of the charged particles, the path extending vertically from the first opening to the second opening. The electric field curtain generating section generates an electric field curtain adjacent to a guide surface of the guide member.

11 Claims, 12 Drawing Sheets

SAMPLER FOR SAMPLING CHARGED PARTICLES, AND APPARATUS FOR MEASURING CHARGE DISTRIBUTION OF THE CHARGED PARTICLES

CROSS REFERENCE

This Nonprovisional application claims priority under 35 U.S.C.§ 119(a) on Patent Application No. 2005-149567 filed in Japan on May 23, 2005, the entire contents of which are hereby incorporated by reference.

BACKGROUND OF THE INVENTION

This invention relates to a sampler for introducing charged particles into a measuring apparatus for measuring charge distribution of the charged particles, and a measuring apparatus provided with such sampler.

There are two widely-used methods, an average charge ratio measuring method and a charge distribution measuring method, as methods for managing property of charged particles such as toner (see KIMURA, Masatoshi: "Toner-Charge Measuring Method (2)-charge amount-", ELECTROPHOTOGRAPHY, pages 168-174, Vol. 30, No. 2 (1991)). Examples of the average charge ratio measuring method include a Faraday Cage method and a toner blow-off method. These average charge ratio measuring methods have been widely used because of its simplicity.

However, image degradation such as fog and low image density might occur, even if the average charge ratio of toner particles falls within allowable standard range. Thus, such image degradations including fog, need further explanation than the average charge ratio of toner particles.

Accordingly, charge distribution measuring methods are developed to manage such property of charged particles that average charge ratio measuring methods can not explain.

There is an apparatus for measuring charge distribution of toner particles, the apparatus employing one of conventional charge distribution measuring methods. The apparatus introduces the toner particles into an interior chamber thereof, producing a laminar air flow having substantially uniform velocity in the space where toner particles are dispersed. The apparatus measures charge distribution of toner particles by determining how much each of the toner particles is deflected by electric fields generated in the interior chamber (see U.S. Pat. No. 4,375,673).

Another example of the conventional charge distribution measuring methods is Laser Doppler method in which vibration of a sound wave is generated by constant frequency, and electric field is established between parallel plate electrodes, then toner particles are passed through the electric field. In the method, phase lag and deflection factor of the toner particles are measured (see TSUJIMOTO, Hiroyuki, and KAYA, Noriyoshi "Effect of suction air velocity and field voltage on measurement for charge amount by E-SPART analyzer", the Micromeritics (Funsai in Japanese), Page 48-54, No. 35, (1991)).

Further, another example of the conventional charge distribution measuring methods is a method which eliminates the necessity of controlling the velocity of air flow. In the method, uniform electric field is generated in horizontal direction and charged particles descend in vertical direction by gravitation (see MASUDA, Hiroaki, GOTOH, Kuniaki, and ORITA, Nobuaki: "Charge Distribution Measurement of Aerosol Particles", the Journal of Aerosol Research, pages 325-332, Vol. 8, No. 4 (1993)).

In addition, there are employed technologies in which charged particles are carried in horizontal direction by traveling-wave electric field, and introduced into an apparatus for measuring charge distribution of the charged particles (see JP2002-311073A and JP2001-116786A).

However, in above mentioned arts, there will be problem that toner particles change in charge amount due to contact with other members during sampling step in which toner particles are separated and introduced into measuring section.

Further, in the measuring apparatus disclosed in U.S. Pat. No. 4,375,673 and TSUJIMOTO et al., there are needed controlling means for controlling velocity of air flow in measuring section in which electric field is established. Such controlling means are generally expensive and cause an inconvenience that charge distribution measuring apparatus become larger.

It is an object of the present invention to provide a sampler that prevents charged particles to be changed in charge amount during sampling step in which the charged particles are introduced by gravity into a measuring apparatus for measuring charge distribution of the charged particles, and a measuring apparatus provided with such sampler.

SUMMARY OF THE INVENTION

A sampler of the present invention introduces charged particles to be measured into an measuring apparatus for measuring charge distribution of the charged particles. The sampler has a main body, a guide member, and an electric field curtain generating section. The main body has a first opening at upper side and a second opening at lower side. The first opening is adapted to receive the charged particles. The second opening is adapted to discharge the charged particles. The guide member defines a path of the charged particles which extends vertically from the first opening to the second opening. The electric field curtain generating section generates an electric field curtain adjacent to a guide surface of the guide member.

The charged particles are introduced into an interior of the sampler through the first opening and led to an entrance of the measuring apparatus through the second opening. In the interior of the sampler, the charged particles are led to the second opening from the first opening by the guide member. At this moment, an electric field curtain is generated adjacent to a guide surface of the guide member in order to prevent the charged particles from contacting with the guide surface. Thus, the charged particles have no contact with the guide surface of the guide member during passing through the interior of the sampler.

Accordingly, while being introduced into the measuring apparatus, the charged particles are not likely to contact with other member and to change in charge amount. In the result, the measuring apparatus is improved in accuracy of measurement.

In addition, it is preferable that the guide member is funnel-shaped. Doing so enables the sampler to gather charged particles more and to introduce the particles into the measuring apparatus with the particles densely gathered, thereby ensuring that efficiency of the measurement is improved.

DETAILED DESCRIPTION OF THE INVENTION

Figure 1:
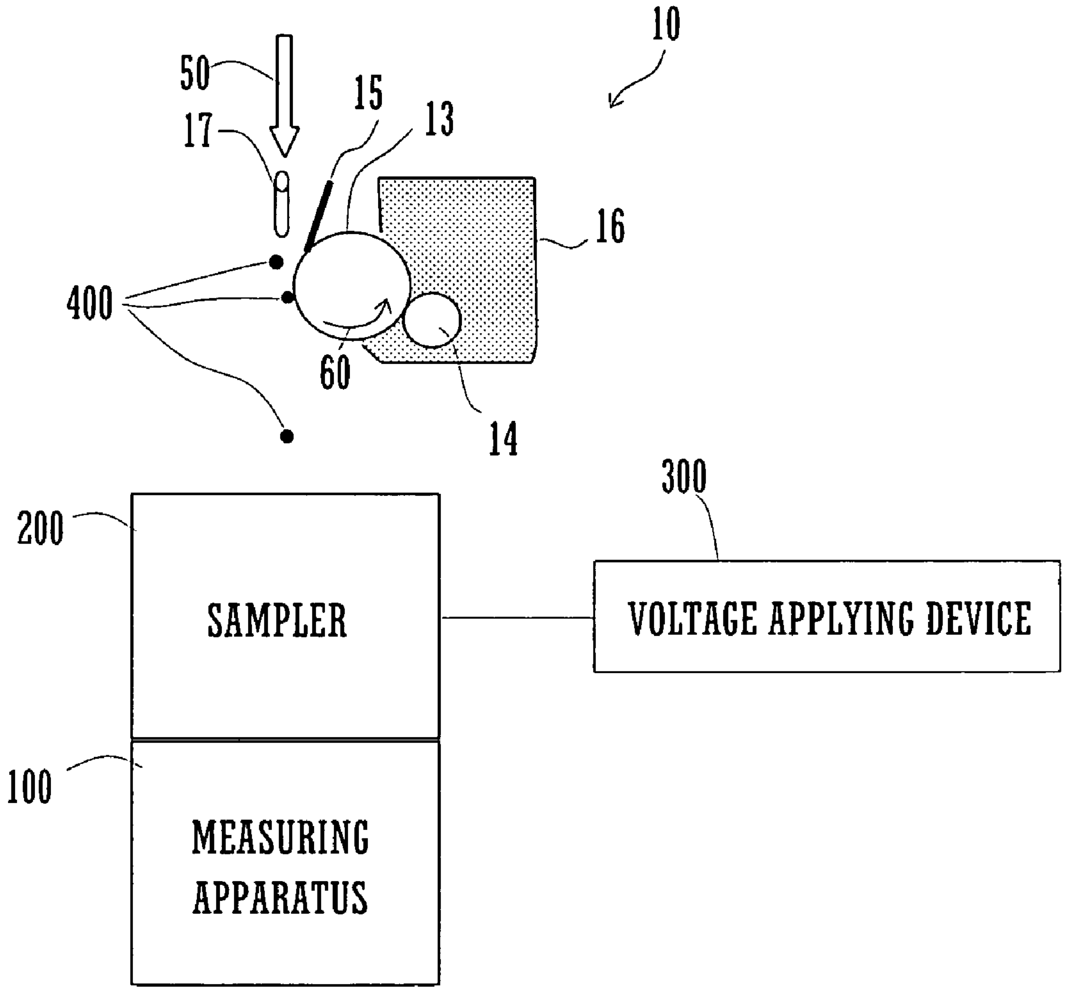
FIG. 1 schematically illustrates charge distribution measurement of toner particles according to an embodiment of the invention.

As illustrated in FIG. 1, there are provided under a developer device 10 a sampler for sampling charged particles (hereinafter referred merely as the sampler) 200 and a charge distribution measuring apparatus (hereinafter referred merely as the measuring apparatus) 100 according to an embodiment of the present invention. The sampler 200 introduces into the measuring apparatus 100 toner particles descending from the developer device 10 in a step of measuring charge distribution of toner particles in the developer device 10.

The developer device 10 is applied to electrophotographic image forming apparatus. The developer device 10 has a developer tank 16, a toner feed roller 14, a development roller 13, and a toner regulating blade 15. The developer tank 16 stores therein toner particles to be fed to a photoreceptor drum. The toner feed roller 14 feeds a surface of the development roller 13 with toner particles stored in the developer tank 16. The development roller 13 feeds toner particles to a surface of the photoreceptor drum. The toner regulating blade 15 regulates layer thickness of toner particles on the development roller 13. There are applied to predetermined electric biases, between the development roller 13 and the toner feed roller 14, and between the development roller 13 and the toner regulating blade 15. Accordingly, toner particles are charged in the developer device 10, and the development roller 13 is covered on its surface with even depth of toner layer.

There is provided a blow off nozzle 17 adjacent to the developer device 10, more specifically adjacent to a portion of the development roller 13's surface, the portion extending to outside of the developer device 10. The blow off nozzle 17 directs a compressed air 50 onto toner layer formed on the developer roller 13 so as to separate the toner particles from surface of the developer roller 13, thereby causing the toner particles to descend into the sampler 200. The blow off nozzle 17 directs the compressed air 50 while the developer roller 13 is rotating in a direction illustrated as an arrow 60 at a predetermined velocity. The blow off nozzle 17 releases the compressed air at such amount that airflow inside the measuring apparatus 100 is not disturbed. Further, the blow off nozzle 17 releases the compressed air intermittently through a solenoid-operated valve. More specifically, the blow off nozzle 17 releases the compressed air for 0.5 second every 3.5 seconds in a period of 15 minutes. An objective of such intermittent releasing is to prevent the compressed air from impinging on the airflow inside the measuring apparatus 100. It should be noted that the blow off nozzle 17 may release the compressed air continuously as long as the compressed air does not impinge on the airflow inside the measuring apparatus 100.

In the embodiment, the blow off nozzle 17 has a fine tip with a 0.3 mm bore diameter. The tip is put closer to development roller 13 as much as possible. An objective of doing so is to separate the toner particles from surface of the developer roller 13 with minimum air. The blow off nozzle 17 is adapted to operate in a first mode in which it blows while reciprocating along an axis of the developer roller 13, or in a second mode in which it blows at a predetermined position without the reciprocating movement.

Figure 2:
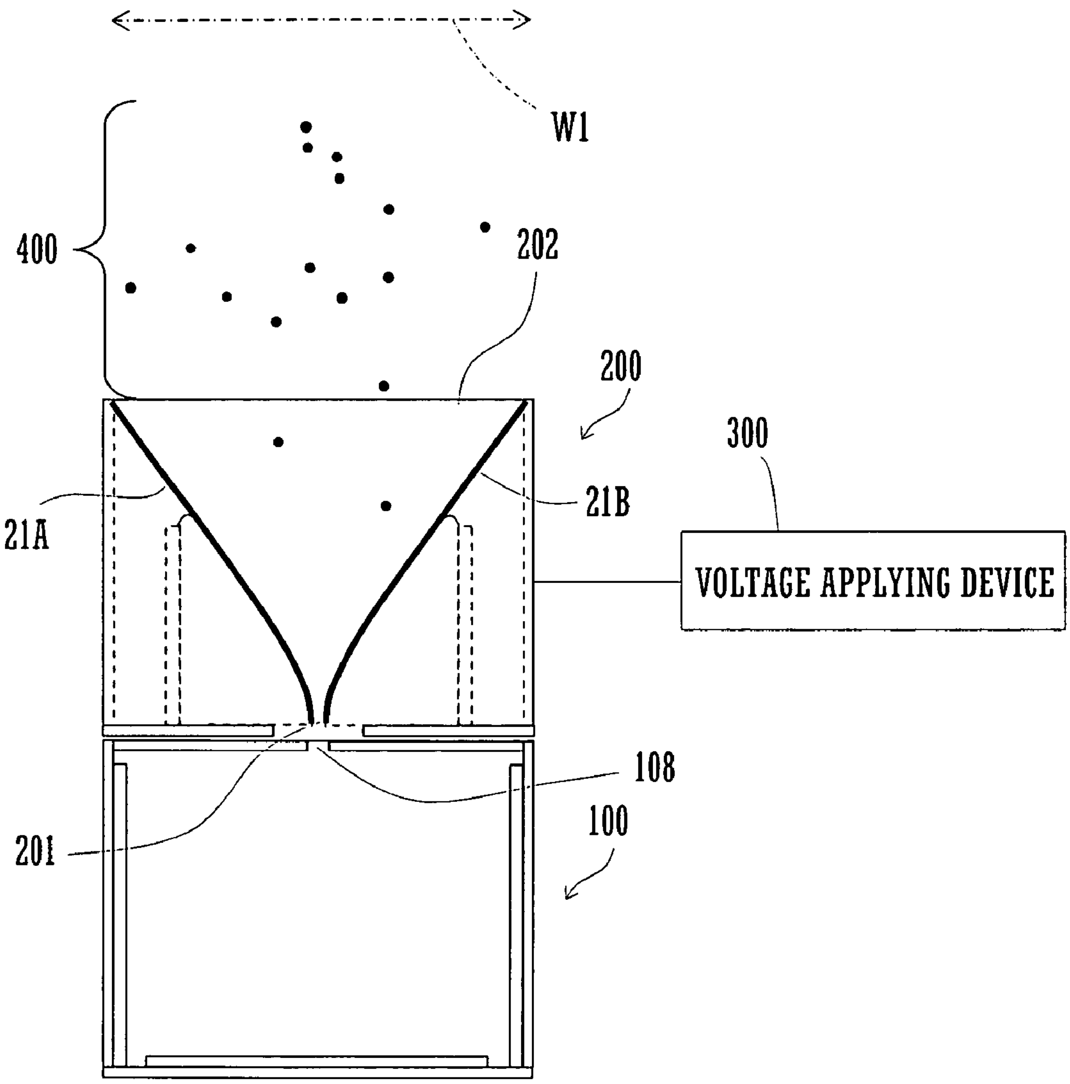
FIG. 2 illustrates schematic configurations of a sampler and a measuring apparatus.

As illustrated in FIG. 2, toner particles 400 blown by the blow off nozzle 17 descend into the sampler 200. The sampler 200, which has openings at top and bottom, leads the blown toner particles to a slit shaped entrance 108 disposed on a top portion of the measuring apparatus 100. In the embodiment, a top opening 202 has a width W1 of approximately 120 mm, and a bottom slit 201 has a width W2 of approximately 1 mm. The width W2 of the slit 201 is designed depending on width of the entrance 108.

Figure 3A:
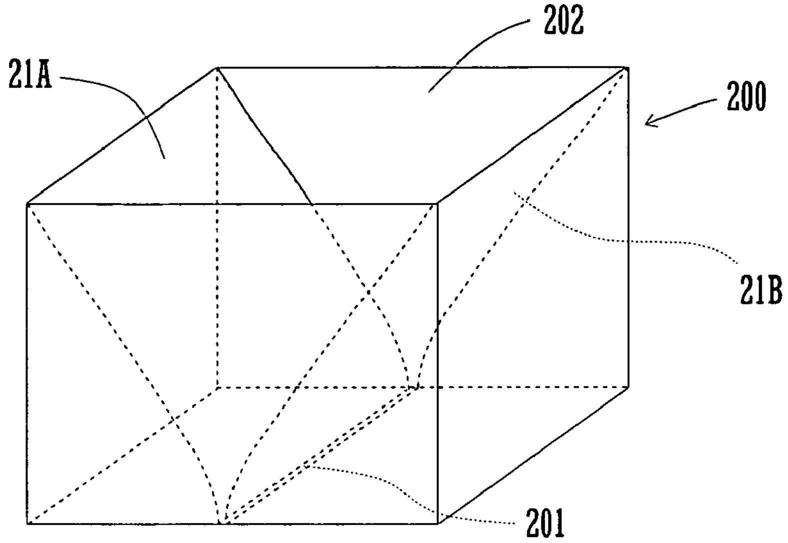
FIGS. 3A to 3C illustrates a schematic configuration of an FPC applied to the sampler.

As illustrated in FIG. 3A, the sampler has a pair of Flexible Printed Circuits (hereinafter referred as FPCs) 21A and 21B. Each of the FPCs 21A and 21B is arranged so as to constitute slanted guide surface which leads the toner particles the entrance 108, thereby defining a path of the toner particles 400 with its cross section gradually narrower downward. In this embodiment, the FPCs 21A and 21B are arranged in a symmetrical manner.

Figure 3B:
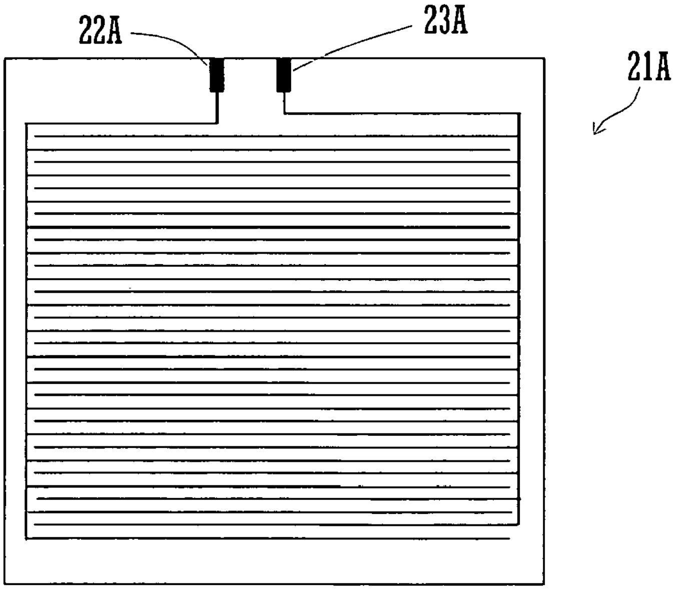

As illustrated in FIG. 3B, the FPC 21A has a first electrode group 22A and a second electrode group 23A. Each of the first electrode group 22A and the second electrode group 23A includes a plurality of liner electrodes.

Figure 3C:
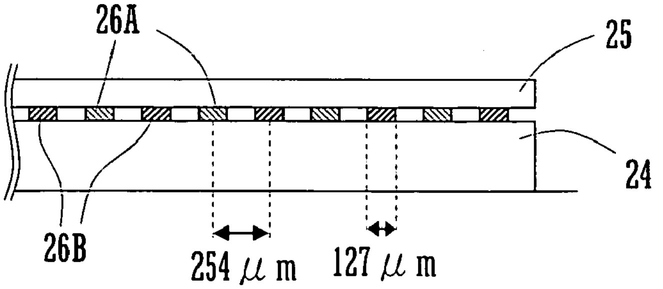

FIG. 3C illustrates a part of the FPC 21A. Each of the linear electrodes 26A and 26B, which is applied to the FPC 21A, has a width of 127 μm, a pitch of 254 μm, and a thickness of 12 μm. The linear electrodes 26A and 26B are formed on a polyimide base 24, and covered with a polyimide coating 25. The polyimide base 24 has a thickness of 50 μm, and the polyimide coating 25 has a thickness of 12.5 μm. The linear electrodes 26A are connected to the first electrode group 22A, and the linear electrodes 26B are connected to the second electrode group 23A. Each of the first electrode group 22A and the second electrode group 23A is connected to a voltage applying device 300.

When the first electrode group 22A and the second electrode group 23A are applied two phase voltages with 180 degrees phase difference, electric field curtain is generated. In this embodiment, standing wave electric field curtain is generated by applying to adjacent electrodes two phase voltages being out of phase with each other by 180 degrees. It should be noted that three electrode groups may be used. There is to be occurred a electric field curtain generating traveling waves, by applying to adjacent electrodes three phase voltages with 120 degrees phase difference. It also should be noted four electrode groups may be used. There is to be occurred a electric field curtain generating traveling waves, by applying to adjacent electrodes four phase voltages with 90 degrees phase difference.

In this embodiment, the first electrode group 22A, the second electrode group 23A, and the voltage applying device 300 constitute an electric field curtain generating section of the invention. The FPC 21B has a substantially same configuration as the FPC 21A, and thus explanation about the FPC 21B is omitted.

Figure 4:
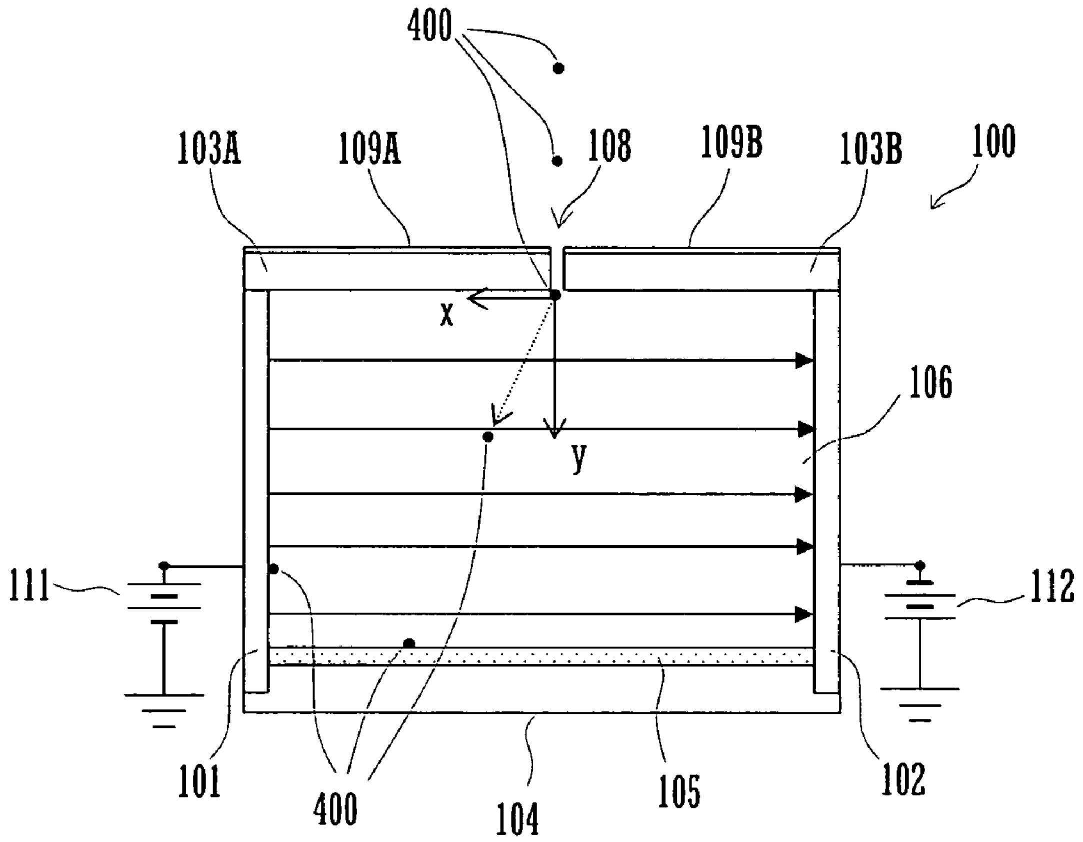
FIG. 4 illustrates a schematic configuration of the measuring apparatus.

There is provided a measuring apparatus 100 under the sampler 200. As illustrated in FIG. 4, the measuring apparatus 100 has a pair of parallel plate electrodes (101,102), top plates (103A, 103B), a side plate 106, a bottom plate 104, a toner collecting plate 105, power sources 111, 112, and plate electrodes (109A, 109B). The parallel plate electrodes (101,102) is arranged along a vertical line so as to deflect charged particles such as toner particles from the vertical line with the electric field. Each of the top plates (103A, 103B) includes a glass plate having a thickness of approximately 10 mm, and acts as a removable lid. Each of the top plates (103A,103B) are arranged in such a manner that there is provided between them a slit-shaped entrance 108 having a width of 1 mm. It is preferable that each of the top plates (103A, 103B) is made from glass which is not likely to be charged, although resins such as ABS (ACRYLONITRILE, BUTADIENE, STYRENE) may be used. The reason comes from the fact that top plates (103A, 103B) made from glass are unlikely to be charged, and thus ensure that charged particles are not attracted to the top plates (103A, 103B) and that electric field at measuring area inside the measuring apparatus 100 is not disturbed.

The side plate 106 is made from acrylic and is arranged around interior measuring area of the measuring apparatus 100. The bottom plate 104 constitutes a bottom of the measuring apparatus 100. The toner collecting plate 105 is made from glass. The power source 111 supplies voltage to the parallel plate electrodes 101. The power source 112 supplies voltage to the parallel plate electrodes 102. The plate electrodes 109A, 109B are connected to the top plates 103A, 103B respectively, and are supplied with voltage from a voltage supplying section not shown.

Described below is measurement of charge distribution of toner particles. The toner particles, which are introduced into the measuring apparatus 100 through the entrance 108, decent vertically by gravity and deflect from the nominal vertical by electric fields established by the parallel plate electrodes 101, 102. Toner particles with large charge amount tend to deflect a lot, thus are likely to be collected at upper portion of the parallel plate electrodes 101,102. On the other hand, toner particles with small charge amount tend to deflect little, thus are likely to be collected at lower portion of the parallel plate electrodes 101,102, or upper surface of the toner collecting plate 105. Accordingly, charge state of toner particles, more specifically charge distribution of toner particles is measured depending on where toner particles are collected and how many toner particles are collected at respective collected points.

Described briefly below is technical idea of measuring charged distribution of toner particles.

Final descend velocities of toner particles in the electric fields perpendicular to the vertical line are given by, Horizontal direction (1)

$$v_x = \frac{C_c qE}{3\pi\mu D_p} + U_x$$

Vertical direction (2)

$$v_y = \frac{C_c m_p g}{3\pi\mu D_p} + U_y$$

where $C_c$ is CUNNINGHAM CORRECTION FACTOR, q is ELECTRIC CHARGE OF A TONER PARTICLE [C], E is ELECTRIC FIELD STRENGTH [V/m], μ is VISCOSITY OF AIR [Pa×s], $D_p$ is DIAMETER OF A TONER PARTICLE (microscopy equivalent circle diameter)[m], $m_p$ is MASS OF A TONER PARTICLE [kg], g is GRAVITATIONAL ACCELERATION [m/s$^2$], $U_x$ is AIR VELOCITY IN X-DIRECTION (direction of the electric field), and $U_y$ is AIR VELOCITY IN Y-DIRECTION (direction of the gravitational force).

In light of particle movement in static air, the air velocities Ux and Uy may be estimated as zero.

In addition, the Cunningham correction factor Cc is approximately 1 as long as particles have a diameter of 0.2 μm or more. Accordingly, the Cunningham correction factor Cc may be estimated as 1 when charge distribution of toner particles is measured. Charged particles, which are introduced into measuring area through upper center thereof, are collected at respective collected points (x, y) given by $$\frac{x}{y} = \left(\frac{q}{m_p}\right)\frac{E}{g} \quad (3)$$

Charge distribution of toner particles can be determined by substituting values of the collected positions and mass of collected particles for variable in the equation (3).

Figure 5:
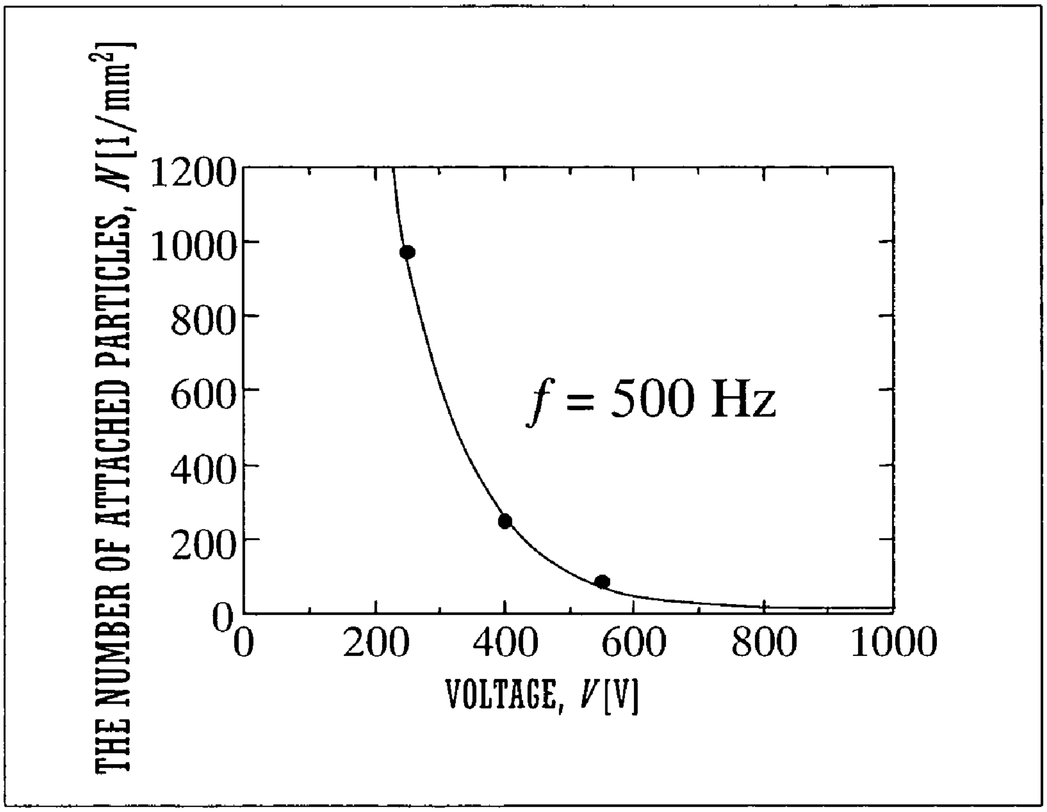
FIG. 5 illustrates effect of voltage on performance of electric field curtain.
Figure 6:
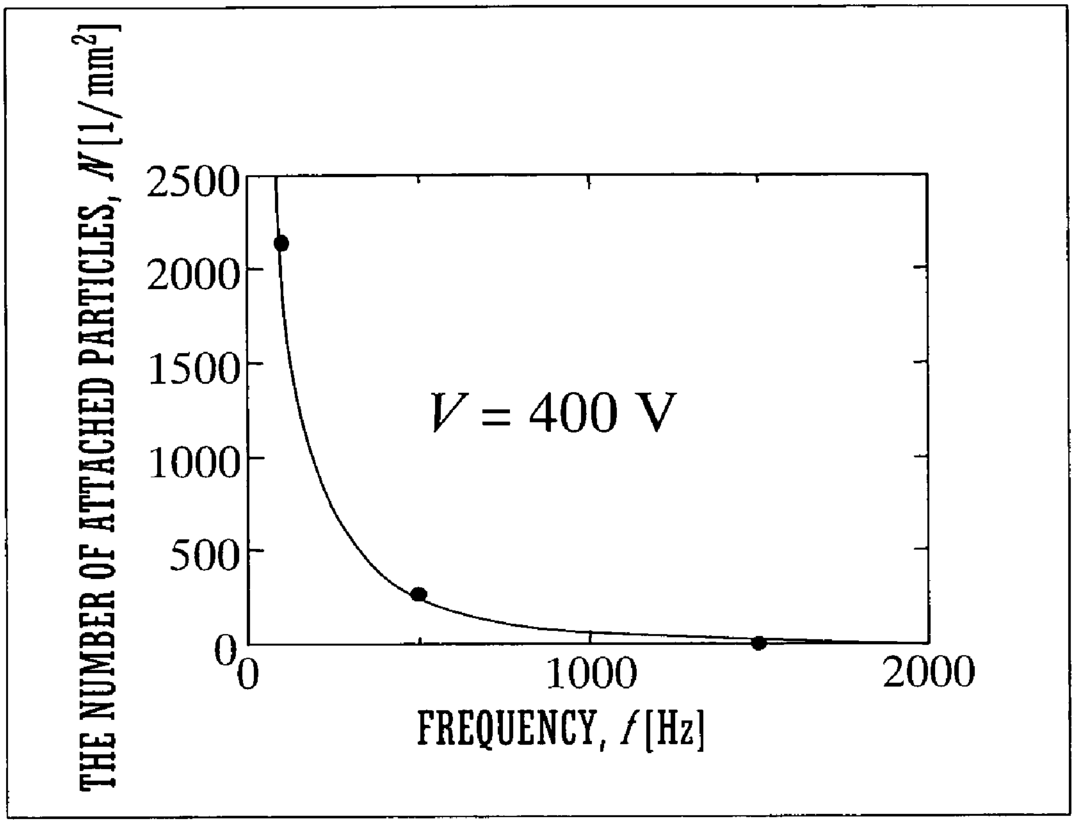
FIG. 6 illustrates effect of frequency on performance of electric field curtain.

Referring now to FIG. 5 and FIG. 6, alternating voltage suitable to generate the electric field curtain will be described.

FIG. 5 is measurement result of amount of toner particles attached to surface of the FPC (21A, 21B) under the condition in which frequency is set to 500 Hz and the applied voltage is variable in amplitude. As illustrated in FIG. 5, number of toner particles decrease with increasing amplitude of applied voltage. Effectiveness of electric field curtain is improved as the amplitude of the applied voltage increases.

FIG. 6 is measurement result of amount of toner particles attached to surface of the FPC (21A, 21B) under the condition in which amplitude of the applied voltage is set to 400V and the frequency is variable. As illustrated in FIG. 6, number of toner particles decrease with increasing frequency. Effectiveness of electric field curtain is improved as the frequency increases.

Figure 7:
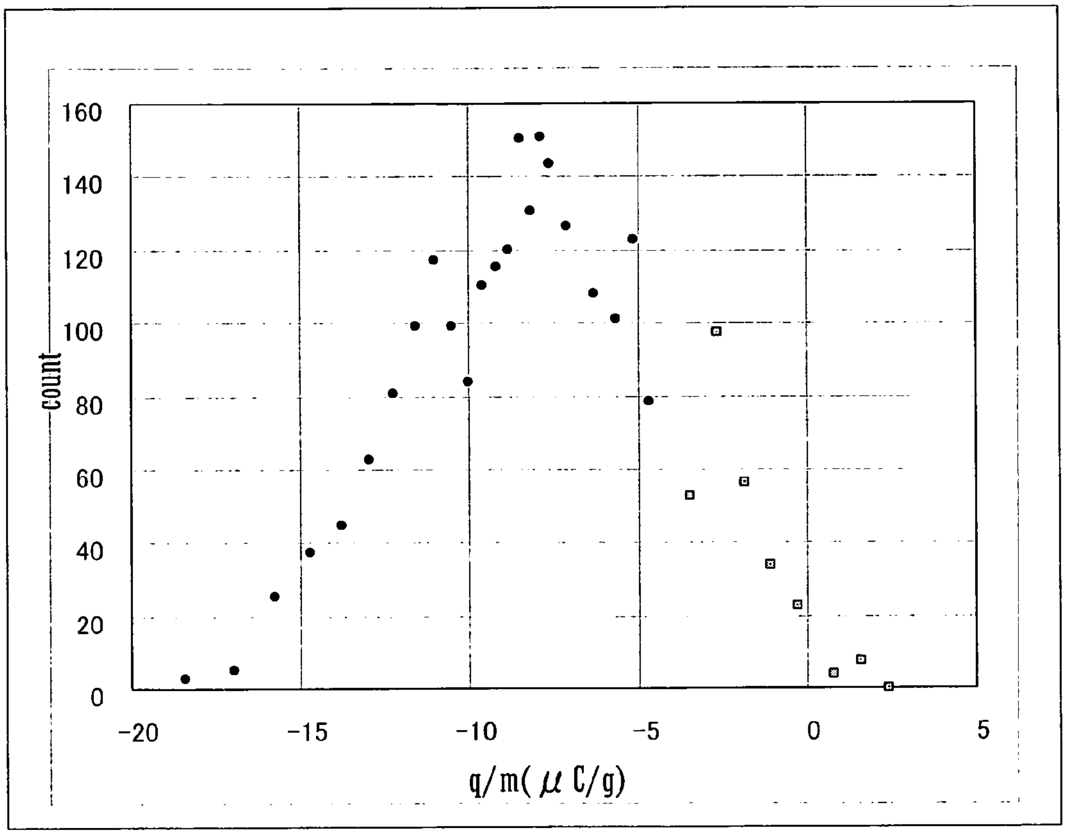
FIG. 7 illustrates measurement result of charge distribution of toner particles, by the sampler and the measuring apparatus.

FIG. 7 is measurement result of charge distribution of toner particles, obtained by using the sampler 200 and the measuring apparatus 100. In FIG. 7, horizontal axis indicates amount of charge, and vertical axis indicates number of toner particles.

Toner particles, which are attached to the toner collecting plate 105 or the parallel plate electrodes 101,102, are detected in X-Y coordinate illustrated in FIG. 4. The charge amount of toner particles at each collected positions are calculated by substituting values of collected position for (x, y) of the equation (3). FIG. 7 illustrates charge distribution of toner particles, with its horizontal and vertical axises indicating respectively amount of charge and number of toner particles at each collected position.

Toner particles 400, which are blown off from the development roller 13 in order to be measured in its charge amount, are likely to be dispersed in air. In this embodiment, the toner particles 400 are to be dispersed in area having width of 100 mm. Thus, toner particles to be introduced into the measuring apparatus 100 through the entrance 108 of 1 mm width are to be about 1% of all the toner particles descend toward the measuring apparatus 100. On the contrary, the sampler 200, which has the top opening 202 of about 120 mm width W1, ensures that almost all the dispersed toner particles are collected. The sampler 200 enables the descending toner particle to be gathered by electric field curtain, and to be led to the entrance 108. Thus, use efficiency of the blown off toner particles can be multiplied by a hundred by the use of the sampler 200.

Although two pairs of the first and second electrode groups (22A, 23A) are used in this embodiment, electric field curtain may be generated by use of other methods. For example, electric field curtain may be generated by use of three or more pairs of electrodes.

Figure 8:
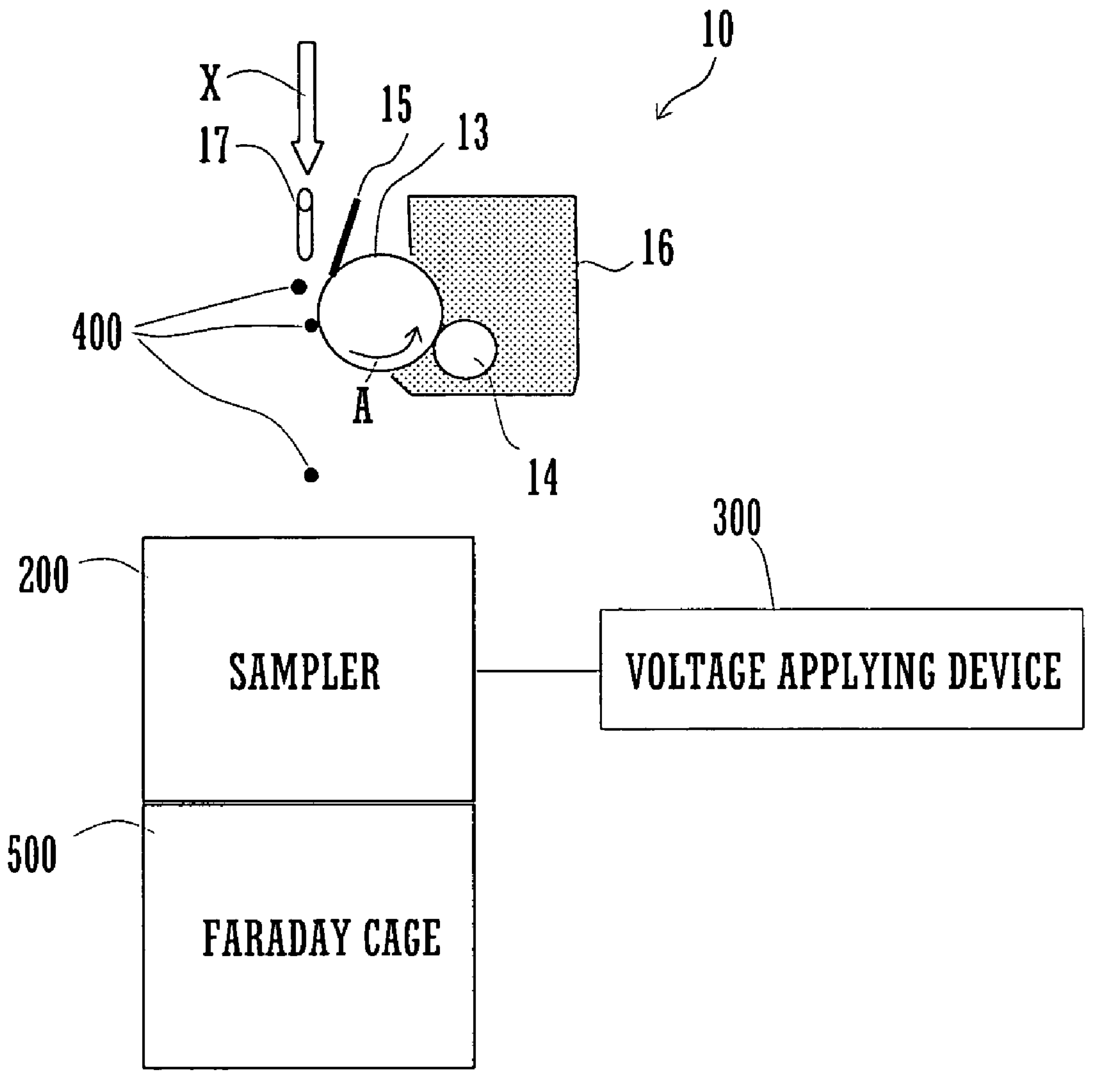
FIG. 8 schematically illustrates charge distribution measurement of toner according to another embodiment of the invention.
Figure 9:
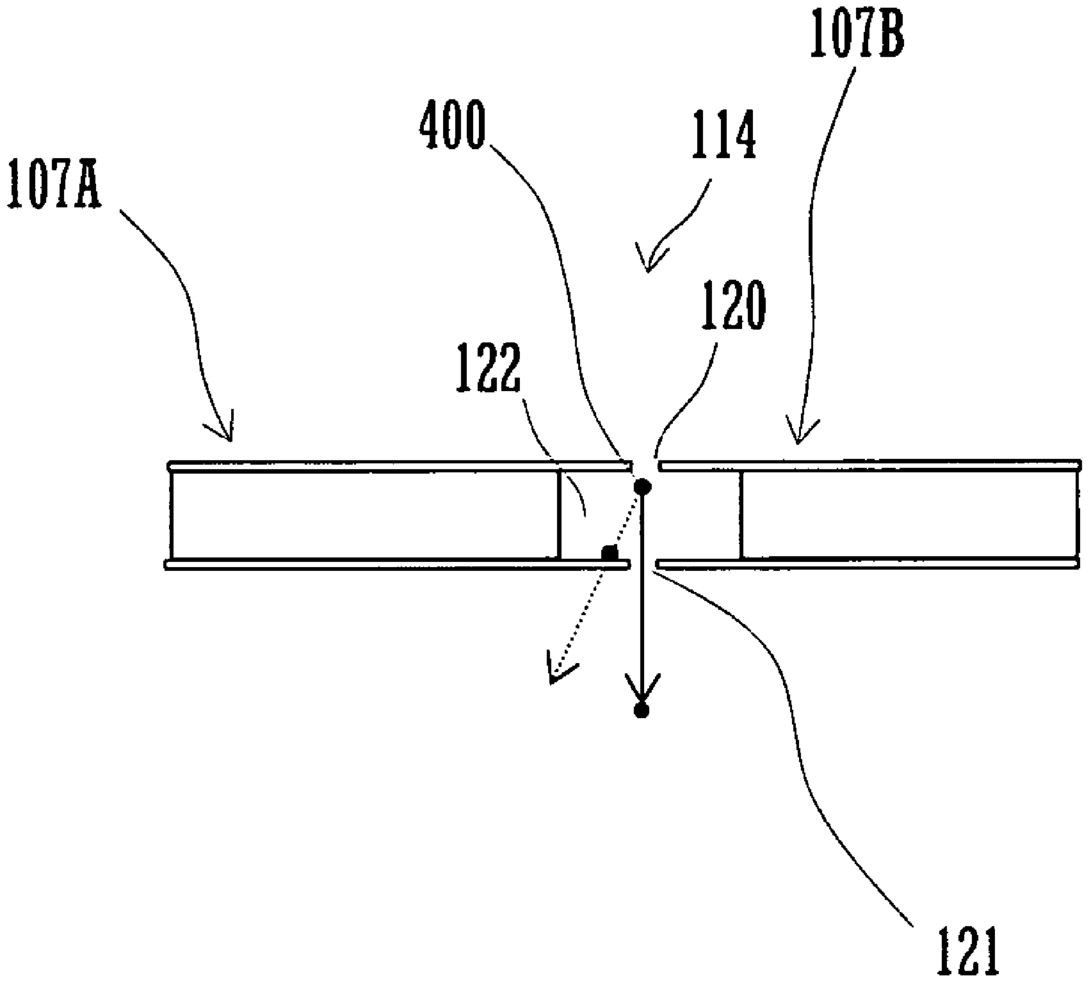
FIG. 9 illustrates another example of configuration of top plates of the measuring apparatus.

In addition, as illustrated in FIG. 8, the sampler 200 may be disposed over a Faraday Cage to apply the sampler 200 to a Faraday Cage method and a toner blow-off method.

Further, a top plates 107A, 107B may be used instead of the top plates 103A, 103B. There is formed a slit-shaped entrance 114 between the top plates 107A and 107B. The entrance 114 has two slits 120,121 both of which are disposed on the same vertical line. The width of each of two slits 120,121 is 1 mm. There is formed between the two slits 120,121 space 122 for collecting toner particles. The entrance 114, with the two slits 120,121, prevents toner particles having horizontal velocity from being introduced into the measuring apparatus 100. Accordingly, measurement error in the measuring apparatus 100 is not likely to occur. Although the entrance 114 has a double slit in this embodiment, the entrance 114 may be provided with triple or more slits.

Figure 10A:
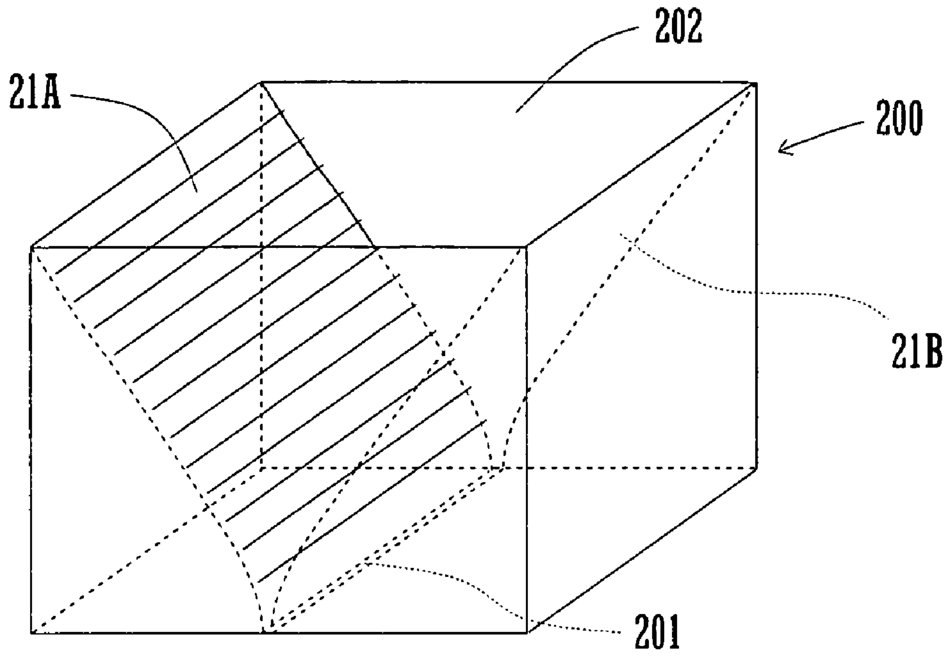
FIGS. 10A and 10B illustrate a schematic configuration of an FPC applied to the sampler.

There are employed in this embodiment a plurality of liner electrodes illustrated in FIG. 10A in order to prevent descending toner particles from being biased in horizontal direction which is parallel to elongated direction of the slit 201. The reason comes from the fact that if toner particles have such horizontal velocity each of the toner particles is to be collected at position not corresponding to its charge amount.

Figure 10B:
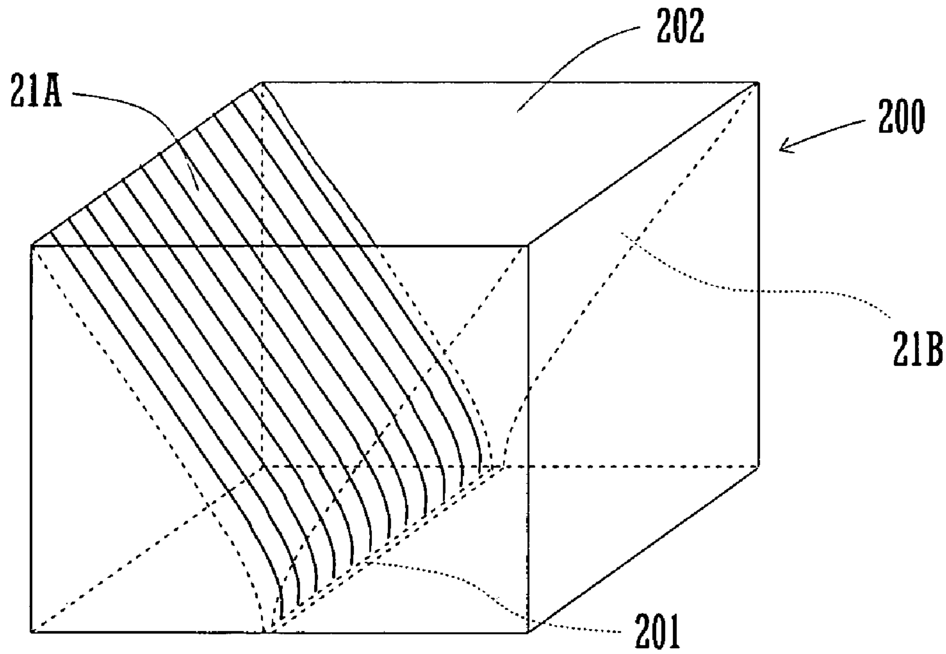

However, in the configuration illustrated in FIG. 10A, toner particles may be trapped at the slit 201 depending on its mass and charge amount. The reason comes from the fact that the gravitational force and upward electrostatic force may balance out in some cases. If toner particles are trapped at the slit 201 in the configuration illustrated in FIG. 10A, liner electrode illustrated in FIG. 10B may be employed. FIG. 10B illustrates liner electrodes which are horizontally arranged. This configuration prevents the toner particles from being attached to surface of the FPC, with stationary wave by applying two phase voltages with 180 degrees phase difference. Further in the configuration of FIG. 10B the toner trap are more unlikely than in the configuration of FIG. 10A. Configuration of the electrode may be selected freely from the configurations in FIGS. 10A and 10B depending on property of charged particles to be measured.

Figure 11A:
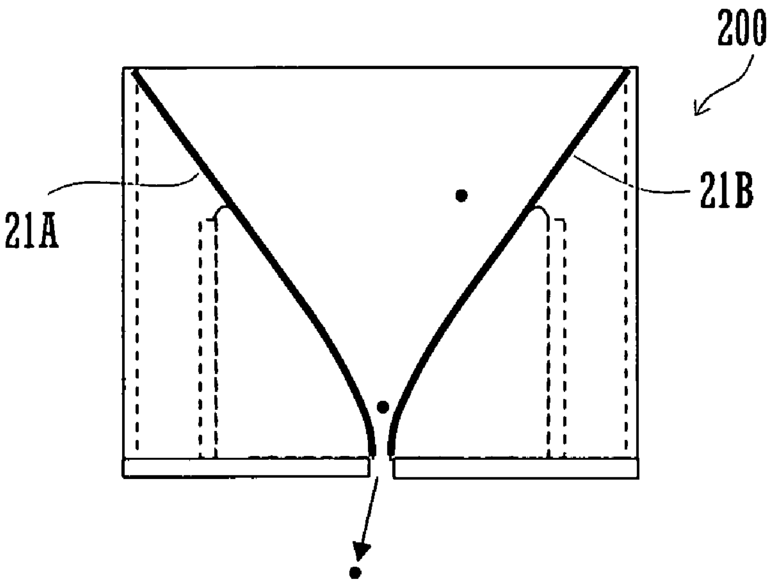
FIGS. 11A and 11B illustrate a schematic configuration of an FPC applied to the sampler, and FIG. 12 illustrate a schematic configuration of an FPC applied to the sampler.
Figure 11B:
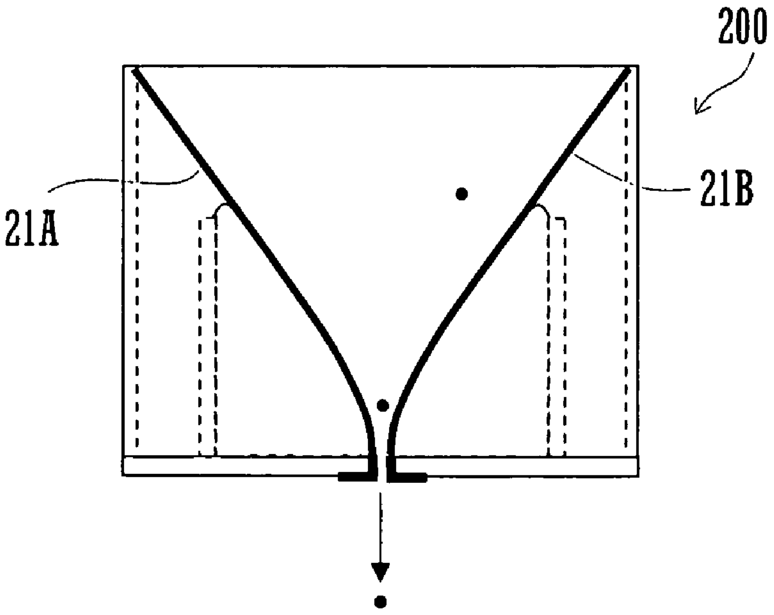

In the above mentioned embodiment, electrodes are provided onto only guide surface of the FPC. If toner particles is likely to be attached to the bottom slit or is likely to have horizontal velocity in the above mentioned embodiment, it is preferable to employ a configuration illustrated in FIG. 11B.

The reason comes from the fact that there may occur at the bottom slit unevenness of electric field caused by structural discontinuity at end portion or opening portion of FPC which generates electric field curtain. On the other hand, a configuration illustrated in FIG. 11B, which employs electrode being formed on the FPC continuously from guide surface through the bottom slit, enable electric field to be generated continuously, thereby ensuring that toner particles are discharged efficiently and vertically.

Figure 12:
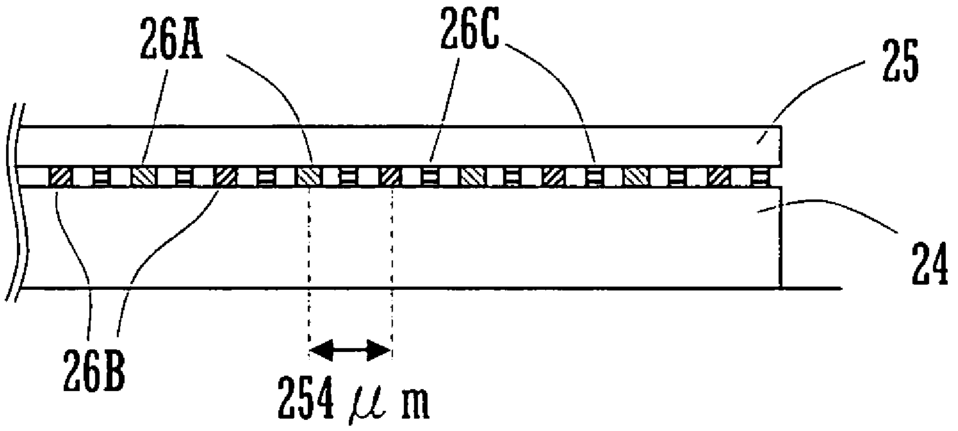

Further, there may be provided, between electrodes for generating two-phase stationary wave, dummy electrode to be applied with ground potential or floating potential. An example of configurations of dummy electrode is illustrated in FIG. 12 where third electrodes 26C are provided each of which is disposed between first and second electrodes having a pitch of 254 μm. When the stationary wave are generated, the first and second electrodes are applied with alternating voltage with 180 degrees phase difference, and the third electrodes are applied with ground potential or floating potential. Employing the first, second and third electrodes prevents charged particles from being attached to surface of the FPC more efficiently than employing only the first and second electrodes. The reason comes from the fact that electric potential between the first and second electrodes is stabilized by employing the third electrodes. In other words, the stabilization of electric potential ensures charged particles not to attach to surface of the FPC.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sampler for introducing charged particles into an apparatus for measuring charge distribution of the charged particles, the sampler comprising:

a main body having a first opening at upper side and a second opening at lower side, the first opening being adapted to receive the charged particles, the second opening being adapted to discharge the charged particles;

guide members defining a path of the charged particles, the path extending vertically from the first opening to the second opening; and an electric field curtain generating section for generating an electric field curtain adjacent to a guide surface of the guide members, wherein the second opening is adjacent to a slit shaped entrance of the apparatus for measuring charge distribution of the charged particles.

2. The sampler according to claim 1, wherein the electric field generating section includes a plurality of electrodes embedded in the guide members, and a voltage applying section for applying AC voltage to the electrodes.

3. The sampler according to claim 2, wherein the electrodes includes a first electrode and a second electrode, the first electrode and the second electrode being out of phase with each other by 180 degrees.

4. The sampler according to claim 2, wherein the electrodes includes a first electrode, a second electrode, and a third electrode, the first electrode and the second electrode being out of phase with each other by 180 degree, the third electrode being applied with a floating potential or a ground potential.

5. The sampler according to claim 2, wherein the guide members are arranged in such a manner that the path of the charged particles has a gradually narrower cross section downward.

6. The sampler according to claim 5, wherein the guide members include a pair of plates facing each other and arranged in such a manner that distance between the plates become narrower downward.

7. The sampler according to claim 6, wherein the electrodes includes a plurality of linear electrodes each extending horizontally.

8. The sampler according to claim 6, wherein the electrodes includes a plurality of linear electrodes each extending along an incline direction of the plates.

9. The sampler according to claim 6, wherein the electrodes are arranged in such a manner that the electrodes extend from the guide surface to the outside of the second opening.

10. An measuring apparatus for measuring charge distribution of the charged particles descending by gravity without the use of air flow, the measuring apparatus comprising:

an entrance for the charged particles provided at the top of the apparatus, and a sampler recited in claim 1, the sampler being disposed over the entrance.

11. The measuring apparatus according to claim 10, wherein the entrance includes a plurality of slits each being disposed in the same vertical line.

* * * * *